United States Patent [19] [11] 4,440,836
Bailey [45] Apr. 3, 1984

[54] NONAQUEOUS CELL EMPLOYING AN ANODE HAVING A BORON-CONTAINING SURFACE FILM

[75] Inventor: John C. Bailey, Columbia Station, Ohio

[73] Assignee: Union Carbide Corporation, Danbury, Conn.

[21] Appl. No.: 449,575

[22] Filed: Dec. 14, 1982

[51] Int. Cl.³ .............................................. H01M 6/16
[52] U.S. Cl. ..................................... 429/48; 429/194; 429/196; 429/197; 429/218
[58] Field of Search ................. 429/48, 101, 194, 196, 429/197, 199, 218, 200

[56] References Cited

U.S. PATENT DOCUMENTS 3,993,501 11/1976 Kalnoki-Kis .......................... 429/48
4,020,240 4/1977 Schlaikjer ............................. 429/50
4,071,664 1/1978 Dey ..................................... 429/194
4,228,229 10/1980 Gabano et al. ...................... 429/196

Primary Examiner—Anthony Skapars
Attorney, Agent, or Firm—Cornelius F. O'Brien

[57] ABSTRACT

A nonaqueous cell employing a liquid active cathode, such as thionyl chloride, and an anode, such as lithium, coated with a boron-containing surface film that will substantially prevent excessive anode passivation during storage or discharge of the cell.

8 Claims, No Drawings

NONAQUEOUS CELL EMPLOYING AN ANODE HAVING A BORON-CONTAINING SURFACE FILM

DESCRIPTION OF THE INVENTION

Technical Field

The invention relates to a nonaqueous cell employing an active metal anode, such as lithium, having a surface layer of a boron-containing material, a cathode and an electrolyte solution containing a solute dissolved in a nonaqueous solvent such as an oxyhalide in which case the oxyhalide also acts as the active cathode. The invention also relates to a method of treating an active metal anode to form a boron-containing layer on its surface and then assembling the pretreated anode within a container along with a cathode and an electrolyte to produce a cell in which excessive passivation or the anode is substantially prevented during storage and usage of the cell.

Background of the Art

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary in order to realize the high energy density obtainable through use of these highly reactive anodes to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside front cover of the Handbook of Chemistry and Physics, 63rd Edition, CRC Press Inc., Boca Raton, Fla., 1982–1983.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a cosolvent will perform this dual function in nonaqueous electrochemical cells. While these solutions perform their dual function, they are not without several disadvantages in use. Sulfur dioxide is always present and being a gas at ordinary temperatures, it must be contained in the cell as a liquid under pressure or dissolved in a liquid solvent. Handling and packaging problems are created if the sulfur dioxide is used alone, and an additional component and assembly step is necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. patent application Ser. No. 439,521 by G. E. Blomgren, et al, filed Feb. 4, 1974, now U.S. Pat. No. 4,400,453, discloses a nonaqueous electrochemical cell comprising an anode, a cathode collector and a cathode-electrolyte, said cathode-electrolyte comprising a solution of an ionically conductive solute dissolved in an active cathode (depolarizer) wherein said active cathode (depolarizer) consists of a liquid oxyhalide of an element of Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a period of about three days or longer, excessive passivation of the anode appears to occur which results in undesirable voltage delays at the beginning of discharge along with high cell impedance.

U.S. Pat. No. 3,993,501 discloses one approach for minimizing or preventing undesirable voltage delays at the beginning of discharge of nonaqueous cells employing an oxyhalide-containing cathode-electrolyte by providing a vinyl polymer film coating on the surface of the anode that contacts the cathode-electrolyte.

U.S. Pat. No. 4,218,523 discloses a nonaqueous cell comprising an active metal anode, such as lithium, a liquid cathode-electrolyte comprising a solute dissolved in a solvent which is an oxyhalide of an element of Group V or Group VI of the Periodic Table and wherein elemental sulfur or a sulfur compound is incorporated into the cathode-electrolyte so as to substantially eliminate initial voltage delay of the cell during discharge.

U.S. Pat. No. 4,277,545 discloses a nonaqueous cell utilizing an active metal anode, such as lithium, a cathode collector and an ionically conductive cathode-electrolyte comprising a solute dissolved in a liquid cathode, such as an oxyhalide, and wherein a vinyl polymer is dissolved in the cathode-electrolyte so as to substantially eliminate initial voltage delay of the cell during discharge.

U.S. Pat. No. 4,020,240 discloses an electrochemical cell employing an electrolyte salt containing a clovoborate anion structure which functions to retard anode passivation during long time storage even at elevated temperatures.

U.S. Pat. No. 4,071,664 discloses an electrochemical cell comprising an active metal anode and an electrolyte solvent/cathode depolarizer which reduces anode passivation during long time storage, even at elevated temperatures, by the inclusion of a minor proportion of an electrolyte salt additive having a clovoborate anion structure.

U.S. Pat. No. 4,228,229 discloses a nonaqueous lithium/oxyhalide cell in which the passivation of the lithium is effectively eliminated by employing a solute for the electrolyte solution which includes a complex salt resulting from the reaction of at least one ionizable compound with aluminum chloride, and wherein said ionizable compound comprises lithium sulphide $Li_2S$, lithium oxide $Li_2O$, calcium oxide CaO, or barium oxide BaO.

In addition to liquid cathode/lithium cells, solid cathode/lithium cells, e.g. $Li/MnO_2$ or $Li/FeS_2$, also exhibit a similar type of initial voltage delay due to excessive passivation of the anode.

One of the objects of the present invention is to substantially prevent the excessive passivation of an active metal anode in a nonaqueous cell by pretreating the anode with a boron-containing material.

Another object of the present invention is to provide a method for treating an anode with a boron-containing material prior to being assembled with a cathode and an electrolyte to produce a nonaqueous cell in which excessive passivation of the anode is substantially eliminated during storage and discharge.

Another object of the present invention is to provide a lithium anode having a surface layer of a boron-containing material which will effectively eliminate excessive passivation of the anode when it is contacted with a nonaqueous electrolyte, such as an oxyhalide electrolyte.

The foregoing and additional objects will become more fully apparent from the following description:

Disclosure of the Invention

The invention relates to a nonaqueous electrochemical cell comprising an active metal anode, a cathode and an ionically conductive electrolyte solution containing a solute dissolved in a nonaqueous solvent and wherein said solute consists of a salt of a first component of a halide of an element selected from the group consisting of Al, Sb, Zr, and P, and a second component of a halide, sulfide, sulfite, oxide or carbonate of calcium or an alkali metal selected from the group consisting of Li, Na, and K; and wherein said active metal anode has a surface layer of a boron-containing material thereon.

The invention also relates to a method for treating an active metal anode and assembling the precoated anode along with a cathode and a nonaqueous electrolyte to produce a cell, which comprises:

(a) preparing a boron-containing material, such as $Li_2B_{10}Cl_{10}$, in a liquid medium, such as $SOCl_2$;

(b) placing an active metal anode, such as lithium, in the boron-containing liquid medium for a time period sufficient to form a boron-containing film on at least a portion of the surface of the anode; and (c) removing the coated anode from the liquid medium and assembling the anode along with a cathode and a nonaqueous electrolyte in a container thereby producing a cell in which excessive passivation of the active metal anode is substantially prevented during storage and usage of the cell.

The nonaqueous electrolyte in step (c) could be any known solute dissolved in a suitable solvent such as a salt of a first component of a halide of an element selected from the group consisting of Al, Sb, Zr, P and B, and a second component of a halide, sulfide, sulfite, oxide or carbonate of calcium or an alkali metal selected from the group consisting of Li, Na, and K dissolved in an organic or inorganic solvent. For some liquid cathodes, such as the oxyhalides; the cathode may also function as the solvent for the cell with or without one or more additional solvents.

Boron-containing materials suitable for treating anodes for use in nonaqueous cells employing liquid or solid cathodes are salts containing closoborate anions. (The term "closoborate" is used here to refer to a class of polyborane derivatives as defined in *Inorganic Chemistry*, Vol. 7, No. 10, Oct. 1, 1968, p. 1947.) The salts can be dissolved in a suitable solvent such as thionyl chloride to produce a solution having therein the boron-containing component. The amount of salt dissolved in the solution should be sufficient to form on the surface of an anode submerged in the solution a layer of the boron-containing material that will effectively prevent excessive passivation of the treated anode when employed in a nonaqueous cell, preferably a cell employing a liquid cathode such as thionyl chloride. The boron-containing salt could be added in any amount in solution as long as it is sufficient to form a layer of the boron-containing material on the anode. An anode, such as lithium, could be placed in the solution containing the closoborate anion for a period of time sufficient to adequately coat the surface of the anode with the boron-containing material. Exposing the anode in the solution for an excessively long period may not provide any additional benefit with regard to preventing excessive passivation of the anode when exposed in a nonaqueous solution. However, it should be realized that the period the anode is exposed in the boron-containing solution will depend on the type of solution employed, the concentration of the boron-containing material in the solution, the composition and condition of the anode surface and the temperature of the solution.

Boron-containing materials which are known in the chemical literature and as disclosed in U.S. Pat. No. 4,071,664, and which would be useful in this invention are $Li_2B_{10}Cl_{10}$, $Li_2B_{10}Br_{10}$, $Li_2B_{12}Cl_{12}$, $Li_2B_{12}I_{12}$, $Li_2B_6Br_6$, $Li_2B_{12}Br_8F_4$, $Li_2B_9Cl_8H$, $Li_2B_9Cl_9$, $Li_2B_9Br_6H_3$, $Li_2B_{11}Br_9H_2$, $Li_2B_{12}H_8F_4$, $Li_2B_{12}H_7F_5$, $Li_2B_{12}H_6F_6$ and $Li_2B_{12}F_{11}OH$. The preferred material would be $Li_2B_{10}Cl_{10}$, $Li_2B_9Cl_9$ and $Li_2B_{12}Cl_{12}$. Other types of boron-containing material which may be useful in this invention are boron oxides, boron halides, boron sulfides, boron phosphates, boron sulfates, boron sulfites and boron hydrides.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyrolactone, sulfolane, ethylene glycol sulfite, dimethyl sulfite, benzoyl chloride, dimethoxyethane, dimethyl isoxazole, diethyl carbonate, sulfur dioxide and the like.

In the preferred embodiment of the present invention, there is provided a nonaqueous electrochemical system comprising a boron-treated active metal anode, a cathode collector, and a liquid cathode-electrolyte comprising a solute dissolved in an active reducible electrolyte solvent such as at least one oxyhalide of a Group V or Group VI element of the Periodic Table, with or without a cosolvent. The active reducible electrolyte solvent performs the dual function of acting as solvent for the electrolyte salt and as an active cathode (depolarizer) of the cell. The term "cathode-electrolyte" is used herein to describe electrolytes containing solvents that can perform this dual function.

The use of a single component of the cell as both an electrolyte solvent and active cathode (depolarizer) is a relatively recent development since previously it was generally considered that the two functions were necessarily independent and could not be served by the same material. For an electrolyte solvent to function in a cell, it is necessary that it contact both the anode and the cathode (depolarizer) so as to form a continuous ionic path therebetween. Thus it has generally been assumed that the active cathode material must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid cathodes, such as the oxyhalides, inhibit the direct reaction of active metal anode surfaces sufficiently to permit them to act as both the cathode material and as the electrolyte carrier for nonaqueous cells, they do cause formation of a surface film on the active metal anode during cell storage particularly at elevated temperatures, which consists of a rather heavy layer of crystalline and/or amorphous material. This layer appears to cause excessive passivation of the anode which results in voltage delay on initial discharge along with high cell impedance values in the range of 11 to 15 ohms for a standard C-size cell.

The extent of anode passivation can be measured by observing the time required for the closed circuit voltage of the stored cell to reach its intended voltage level after discharge has begun. If this delay exceeds 20 seconds, that anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the electrical load.

The exact composition of this layer is not known. The thickness and density of the layer as well as the size and shape of the crystals were observed to vary with the length of the storage period and also with the temperature during storage, e.g., at low temperatures there is relatively little growth of the layer as compared to the greater growth of the layer at higher temperatures of about 70° C.

In accordance with the present invention, it has been found that excessive anode passivation can be substantially prevented by treating the anode with a boron-containing material so as to form on the surface of the anode a layer or film of a boron-containing material. Although not wanting to be bound by theory, it is believed that when treating lithium anodes, a lithium boride layer is formed on the surface of the anode which will retard excessive passivation of the anode when placed in a liquid oxyhalide solution such as a thionyl chloride solution. Accordingly, boron oxides, halides, sulfides etc, would probably boride the surface of a lithium anode easier than the closoborates since removal of boron from most of these materials through reaction with the lithium metal would occur more readily than from the rather stable closoborates. It is also believed that the boride layer formed on the anode is insoluble in an oxyhalide solution.

The active liquid reducible cathode material (depolarizer) for use in this invention can either be mixed with a conductive solute which is a nonreactive material but is added to improve conductivity of the liquid active reducible cathode materials, or it can be mixed with both a reactive or nonreactive conductive solute and a reactive or nonreactive cosolvent material. A reactive cosolvent material is one that is electrochemically active and, therefore, functions as an active cathode material while a nonreactive cosolvent material is one that is electrochemically inactive and, therefore, cannot function as an active cathode material. Suitable nonaqueous cathode materials would include sulfuryl chloride, thionyl chloride, phosphorus oxychloride, thionyl bromide, chromyl chloride, vanadyl tribromide, selenium oxychloride, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and liquid $SO_2$.

Suitable solid cathodes would include $MnO_2$, $FeS_2$, $V_2O_5$, $Ag_2CrO_4$, $CF_x$, $C_2F$ and the like.

A separator, if employed in the cell of this invention, would have to be chemically inert and insoluble in the electrolyte solution and have a porosity so as to permit the liquid electrolyte to permeate through and contact the anode of the cell, thus establishing an ion transfer path between the anode and cathode. A suitable separator for use in this invention is a nonwoven or woven glass fiber mat.

In liquid cathode cells, any compatible solid which is substantially electronically conductive will be useful as a cathode collector. It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form, such as a metallic film, screen or a pressed powder. Prererably, however, a pressed powder collector should be made at least partially of carbonaceous or other high surface area conductive material.

The solute may be a simple or double salt which will produce an ionically conductive solution when dissolved in the solvent. Preferred solutes are complexes or inorganic or organic Lewis acids and inorganic ionizable salts. The main requirements for utility are that the salt, whether simple or complex, be compatible with the solvent being employed and that it yield a solution which is ionically conductive. According to the Lewis or electronic concept of acids and bases, many substances which do not contain active hydrogen can act as acids or acceptors of electron doublets. The basic concept is set forth in the chemical literature (Journal of the Franklin Institute, Vol. 226—July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluroide, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, potassium bromide, calcium oxide, barium oxide, and lithium carbonate.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are aluminum, calcium, and the alkali metals such as lithium, sodium and potassium.

If it is desired to render the electrolyte solution more viscous or convert it into a gel, a gelling agent such as colloidal silica may be added.

The following example is illustrative of the present invention and is not intended in any manner to be limitative thereof.

Example

Two lithium anodes measuring 1.3 inches by 0.42 inch were placed in a 0.25 M $Li_2B_{10}Cl_{10}$-$SOCl_2$ solution for 14 days at 25° C. Each of the treated anodes was then assembled in a 0.475 inch diameter container along with a nonwoven glass fiber separator and a cathode-electrolyte comprising 1.5 M $LiAlCl_4$-$SOCl_2$ solution. A similar cell was produced except the anode was untreated. The three cells so formed were stored for 45 days at 25° C. and then each cell was discharged across a 75 ohm load. The voltage data obtained versus time are shown in the table.

TABLE

| Voltage (volts) | | | |
| --- | --- | --- | --- |
| Untreated | Treated Anodes | | |
| Anode | Cell A | Cell B | Time (sec) |
| 3.67 | 3.67 | 3.67 | 0 |
| 1.05 | 2.83 | 2.83 | 1 |
| 1.07 | 2.91 | 2.88 | 2 |
| 1.11 | 2.95 | 2.91 | 5 |
| 1.20 | 2.93 | 2.92 | 10 |
| 1.28 | 2.93 | 2.93 | 15 |
| 1.35 | 2.94 | 2.94 | 20 |
| 1.42 | 2.95 | 2.95 | 30 |

What is claimed is:

1. A nonaqueous cell comprising an active metal anode, a cathode and an ionically conductive electrolyte solution containing a solute dissolved in a nonaqueous solvent and wherein said solute consists of a salt of a first component of a halide of an element selected from the group consisting of Al, Sb, Zr, and P, and a second component of a halide, sulfide, sulfite, oxide or carbonate of calcium or an alkali metal selected from the group consisting of Li, Na, and K; and wherein said active metal anode has a surface layer of a boron-containing material thereon.

2. The nonaqueous cell of claim 1 wherein the cathode is a liquid, cathode which also functions as a solvent thereby producing a cathode-electrolyte.

3. The nonaqueous cell of claim 2 wherein the cathode-electrolyte contains at least one liquid selected from the group consisting of thionyl chloride, sulfuryl chloride, phosphorous oxychloride, thionyl bromide, chromyl chloride, vanadyl tribromide, selenium oxychloride, selenium tetrafluroide, selenium monobromide, thiophosphoryl chloride, thiophosphoryl bromide, vandium pentafluoride, lead tetrachloride, titanium tetrachloride, disulfur decafluoride, tin bromide trichloride, tin dibromide dichloride, tin tribromide chloride and liquid $SO_2$.

4. The nonaqueous cell of claim 1 wherein the anode is selected from the group consisting of lithium, sodium, calcium, potassium, and aluminum.

5. The nonaqueous cell of claim 2 wherein the anode is lithium and the liquid cathode is thionyl chloride.

6. The nonaqueous cell of claim 2 wherein the anode is lithium and the liquid cathode is sulfuryl chloride.

7. The nonaqueous cell of claim 3 wherein the salt is $LiAlCl_4$; the cathode electrolyte is thionyl chloride; and the anode is lithium.

8. The nonaqueous cell of claim 1 wherein the cathode is selected from the group consisting of $MnO_2$, $FeS_2$, $V_2O_5$, $Ag_2CrO_4$, $CF_x$, and $C_2F$.

* * * * *